US00RE38207E

(19) United States
(12) Reissued Patent
Benoist

(10) Patent Number: US RE38,207 E
(45) Date of Reissued Patent: Aug. 5, 2003

(54) VALVE WITH OUTLET FLOW RATE REGULATION, AND CONTAINER EQUIPPED WITH SUCH A VALVE

(75) Inventor: Jean-Francois Benoist, Lagny/Marne (FR)

(73) Assignee: L'Oreal, Paris (FR)

(21) Appl. No.: 09/824,036

(22) Filed: Apr. 3, 2001

Related U.S. Patent Documents

Reissue of:
(64) Patent No.: 6,145,712
Issued: Nov. 14, 2000
Appl. No.: 09/233,064
Filed: Jan. 20, 1999

(30) Foreign Application Priority Data

Jan. 23, 1998 (FR) ..... 98 00720

(51) Int. Cl.[7] ..... B65D 83/16
(52) U.S. Cl. ..... 222/402.1; 222/402.2; 222/494; 222/497
(58) Field of Search ..... 222/402.1, 402.2, 222/402.11, 494, 495, 496, 497, 545; 137/536, 538; 239/337, 340, 362, 573

(56) References Cited

U.S. PATENT DOCUMENTS 2,618,290 A * 11/1952 Van Vliet ..... 137/536
2,781,950 A * 2/1957 Pritchard ..... 222/402.11
3,666,148 A * 5/1972 Webster ..... 222/402.1
3,913,804 A * 10/1975 Laauwe ..... 222/402.11
4,577,784 A * 3/1986 Brunet ..... 222/402.2

FOREIGN PATENT DOCUMENTS

FR 2711973 * 5/1995

* cited by examiner

*Primary Examiner*—Henry C. Yuen
*Assistant Examiner*—Melvin Cartagena
(74) *Attorney, Agent, or Firm*—Oblon, Spivak, McClelland, Maier & Neustadt, P.C.

(57) ABSTRACT

A valve (1), particularly for an aerosol container, includes, inside a valve body (2), an inlet passage (4) communicating with the container and an outlet passage (10), a first elastic return (16) for urging the valve (1) into the closed position, and a regulator for regulating the product outlet flow rate, which includes a second elastic return (14) for supplying a set-point pressure for the regulator. The second elastic return (14) is arranged in a compartment (12) of the valve body (2) isolated from the product, the pressure inside the compartment (12) being equal to atmospheric pressure.

46 Claims, 3 Drawing Sheets

VALVE WITH OUTLET FLOW RATE REGULATION, AND CONTAINER EQUIPPED WITH SUCH A VALVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a valve of an aerosol container for example, intended for dispensing a product at an essentially constant flow rate, for example, a cosmetic product. The invention is most particularly suited for dispensing deodorants or hairstyling products, especially lacquers or mousses.

2. Description of the Related Art

Modernly, the problem of variations in performance between the initial use of a container and the final use is encountered in the field of aerosol dispensers. These problems arise, in particular, in devices in which the product is pressurized by means of a compressed gas, especially carbon dioxide or nitrogen dioxide. In such devices, the gas is either directly in contact with the product or isolated from the product by a piston or a bag containing the product. The variations in flow rate and/or pressure are directly associated with the pressure drops inside the container, which inevitably cause a drop in product outlet flow rate.

It is known, as evidenced by EP-A-0,450,990, to provide a regulator inside a valve so as to regulate the outlet flow rate of the dispensed product. Such regulating systems entail, among other things, the use of a calibrated spring, controlling the extent to which an orifice is open or closed, depending on the pressure inside the regulating chamber relative to the set-point pressure imposed by the spring. In operation, a raised pressure in the regulating chamber causes the inlet orifice of the regulating chamber to close until, once a sufficient quantity of product contained in the regulating chamber has been discharged, the pressure in the chamber returns to the nominal pressure. One of the drawbacks associated with such a regulating system stems from the fact that the calibrated spring is arranged in a part of the valve body in communication with the product. The pressure in this part of the valve body is a partial pressure somewhere between atmospheric pressure and the pressure inside the container. Such a pressure depends on the internal pressure of the container and on any pressure drops incurred as far as the product outlet orifice. The pressure also depends on the product contained in the container, particularly on its vapour pressure. Thus, for each new formulation, it is necessary to use a different calibrated spring, which makes the system somewhat inflexible. Furthermore, the means of shutting off the outlet orifice are not secured to the piston, and this results in a less precise flow rate regulation.

FR-A-2,711,973 describes a push-button, in which a regulating system is arranged. The drawbacks of such a system are mainly of two fold. On one hand, the regulating system takes up a significant amount of space in the push-button, which leaves little latitude for designing the supply to the outlet nozzle or the diffusing system and spray mechanism. On the other hand, between uses, the means of shutting off the regulating chamber are in communication with the outside of the container, and therefore with the air, which entails a high risk of the shutter "sticking", especially in the case of products with a high resin content.

SUMMARY OF THE INVENTION

Thus, one of the objects of the invention is to produce a flow rate regulating valve which does not have the drawbacks relating to the regulating devices discussed earlier with reference to the devices of the prior art.

In particular, one object of the invention is to provide a valve with a built-in regulating device which is reliable and economical to produce, and in particular, a valve in which the set-point value does not vary according to the product to be dispensed or according to the variations in pressure inside the container on which it is intended to be mounted.

Another object of the invention is to provide a valve to which any kind of dispensing head can be fitted, and which leaves a great amount of latitude in choosing the diffusing characteristics of the head.

According to a first aspect of the invention, these objects are achieved by producing a valve, particularly for an aerosol container, with a valve body that includes an inlet passage communicating with the container and an outlet passage, means for placing the outlet passage in communication with the inlet passage in response to an actuation command, first elastic return means for urging the valve into the closed position, and means for regulating the product outlet flow rate including second elastic return means for supplying a set-point pressure for the regulating means. In this embodiment, the second elastic return means is arranged in a compartment of the valve body isolated from the product, the pressure inside the compartment being equal to atmospheric pressure.

Thus, since the elastic return means is at atmospheric pressure, the set-point imposed is constant irrespective of the formulation, and irrespective of the pressure inside the container. Furthermore, since the closing means associated with the regulating system are situated inside the valve body, that is to say isolated from the outside when the valve is in the closed position, there is no sticking or soiling of the regulating mechanism which therefore remains reliable over time.

Advantageously, the flow rate regulating means includes a regulating chamber arranged between the inlet passage and the outlet passage. The regulating chamber includes an inlet orifice and an outlet orifice. The flow rate regulating means also includes closing (or shut-off) means mounted on the second elastic return means provided for altering the extent to which the inlet orifice and/or outlet orifice is/are open, according to the pressure inside the regulating chamber (in actual fact, inside the part in which the product flows). The second elastic return means is arranged in a compartment of the regulating chamber isolated from the product by a moving piston in direct communication with the outside, and therefore kept at atmospheric pressure. Thus, even in the event of unwanted diffusion past or around the piston, the pressure inside the compartment containing the calibrated spring remains identical to atmospheric pressure.

Advantageously, the moving piston is secured to the first closing means. This plays a part in improving the precision with which the product outlet flow rate is regulated.

In a specific embodiment, the closing means include first means of shutting off the outlet orifice, having an annular skirt borne by the piston and arranged inside the regulating chamber. The position of the annular skirt with respect to the outlet orifice determines the extent to which the outlet orifice is open. The annular skirt is monolithically formed with the piston by molding a thermoplastic such as a polyolefin, especially a polyethylene or a polypropylene.

Advantageously, the moving piston is mounted slidably inside the regulating chamber. The seal between the compartment containing the calibrated spring and the compartment forming the actual regulating chamber is improved by using a flexible diaphragm arranged inside the body of the regulating chamber between the piston and the calibrated spring. As a preference, such a diaphragm is overmoulded or two-shot injection moulded with the body of the regulating chamber. This diaphragm improves the seal between the two compartments of the regulating chamber without appreciably affecting the force exerted on the piston by the second elastic return means.

Also, advantageously, a stop means is provided for maintaining a minimum product outlet flow rate in the event of an overpressure inside the regulating chamber. Thus, the product contained in the regulating chamber can be discharged until the pressure inside the regulating chamber returns to the set-point level imposed by the second elastic return means, thus avoiding any valve blockage.

The closing means may also include second closing means secured to the moving piston for altering the extent to which the inlet orifice of the regulating chamber is open, according to the pressure inside the regulating chamber. The first and second closing means are configured such that when the inlet orifice is in the closed position, the outlet orifice is at least partially open. In this embodiment, the degree of regulation of the valve is further improved because the pressure inside the regulating chamber is also regulated.

In a particular embodiment, the inlet orifice is arranged in the end wall of the regulating chamber, and the outlet orifice is situated in a side wall of the regulating chamber at a predetermined distance from the end wall of the regulating chamber. An annular lip provides the seal between the regulating chamber and the valve body, around the regulating chamber, where the sealing lip is arranged axially between the end wall of the regulating chamber and the outlet orifice. Such an annular lip can be obtained by molding with the regulating chamber.

In a preferred embodiment, the outlet passage is formed of a valve stem secured to the regulating chamber, the regulating chamber being mounted on the first elastic return means, where the valve stem comprises a part that emerges from the valve body and forms an outlet duct that can be placed in communication with the valve body via a passage that passes radially through the valve stem. Alternatively, this may be a valve of the "female" type intended to take a hollow stem bore by the valve-actuating mechanism.

Advantageously, when the valve is in the closed position, the radial passage is kept opposite a seal located in the upper part of the valve body.

In another preferred embodiment, when the pressure inside the regulating chamber drops below a predetermined value, the closing means shut off the outlet orifice of the regulating chamber in a leaktight manner so as to interrupt the dispensing of product. Thus, any spraying or diffusing whose characteristics might not be satisfactory, due to an insufficient outlet pressure, is prevented.

A second aspect of the invention provides a container for dispensing a product under pressure and equipped with a valve of the first aspect.

Such a container may comprise a body defining a reservoir containing the product to be dispensed, and one end of which is closed by an end wall, the other end being surmounted by the valve. The means of actuating the valve may include a push-button which may exhibit diffusing means for discharging the product. Such a container may be in the form of a flexible bag which may possibly be placed inside a rigid body, a tube or a can.

By way of example, the diffusing means consist of a nozzle, especially a swirl-inducing nozzle, a grating or a porous end piece such as a sinter or an open-cell foam. The product may consist of a hairstyling product such as a lacquer, spray or mousse, a deodorant, or a beauty care product such as a milk, oil, cream or gel.

BRIEF DESCRIPTION OF THE DRAWINGS

Apart from the arrangements explained hereinabove, the invention consists of a certain number of other arrangements which will be described hereafter with regard to non-limiting embodiments described with reference to the appended Figures, among which.

DETAILED DESCRIPTION OF THE PREFERRED EMBODIMENTS

Figure 1:
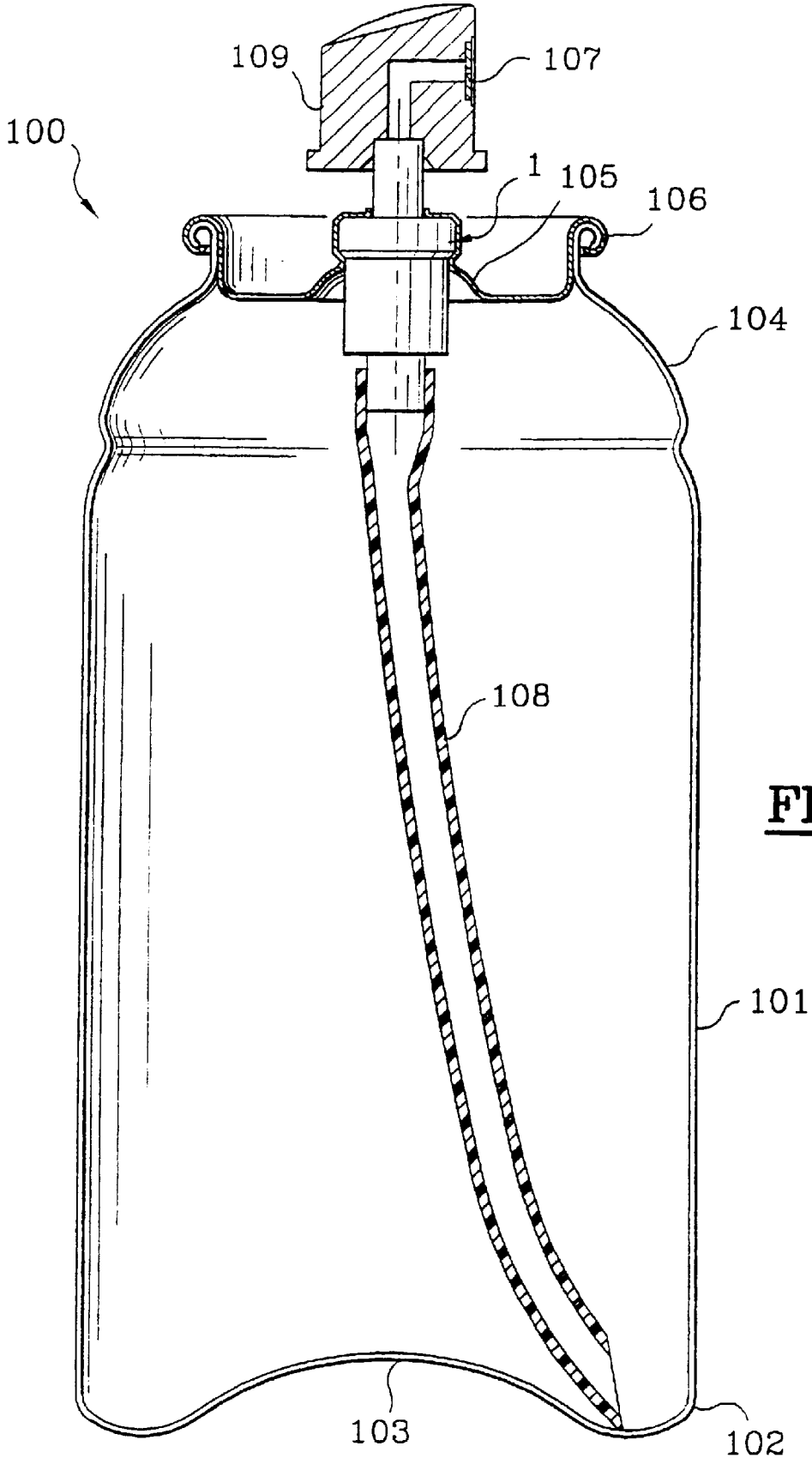
FIG. 1 is a sectional view of one embodiment of a container equipped with a valve according to the invention.

The container 100 depicted in FIG. 1 is in the form of a can, for example made of aluminium, comprising a body 101, and a first end 102 which is closed by an end wall 103. A second end 104 is open and is surmounted by a valve 1 mounted on a dish 105, crimped to a rolled-over edge 106 of the can. The valve 1 is crimped or clipped to the dish 105. A push-button 109 is mounted on the valve so as to allow the valve 1 to be actuated and the product to be diffused via an outlet nozzle 107. A dip tube 108 is connected to the valve 1 and descends more or less as far as the end wall 103 of the can. The valve will be described in detail with reference to FIGS. 2A–2C and 3A–3C.

Figure 2A:
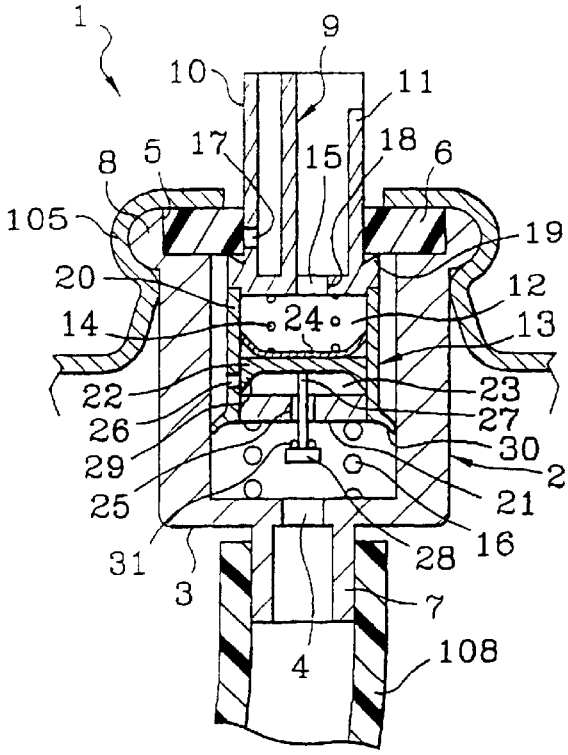
FIGS. 2A–2C are sectional views of a first embodiment of a valve according to the invention.
Figure 2B:
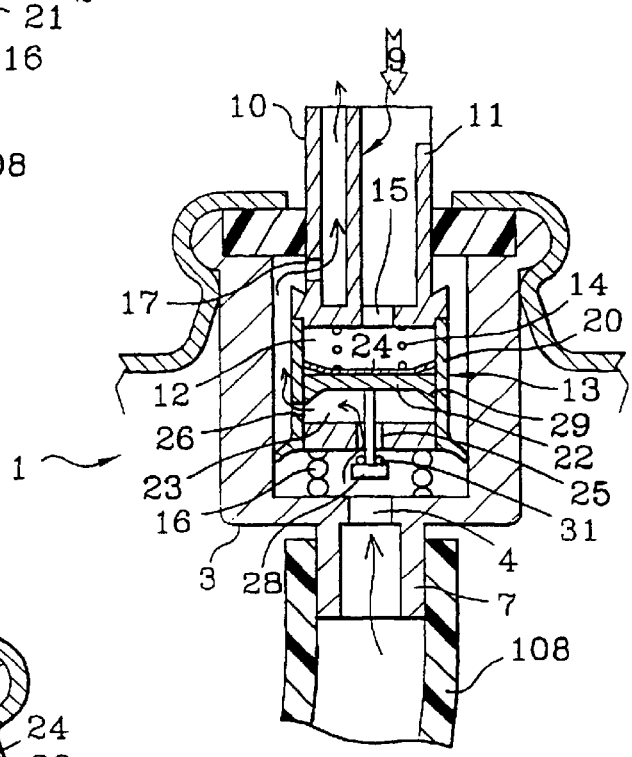
Figure 2C:
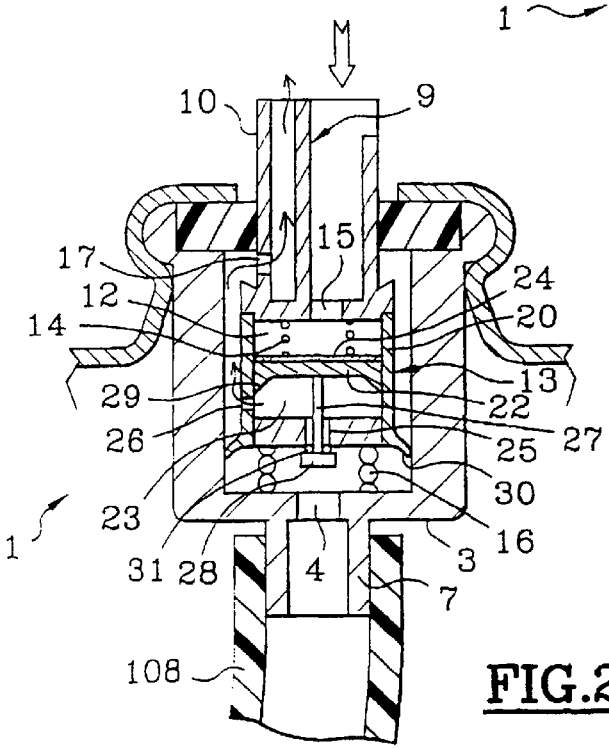

In the embodiment of FIGS. 2A–2C, the valve 1 mainly comprises a body 2, the end wall 3 of which has, at its center, an orifice 4 surrounded by an axial hollow shaft 7, arranged outside the valve body 2, and intended to receive a dip tube 108. The end of the valve body opposite to the end wall 3 is open. The edge delimiting the opening 5 of the valve body 2 forms on its exterior surface a roll 8 intended for attaching the valve 1 to a valve-holder dish 105. The edge also forms, inside the valve body 2, a recess intended to receive a seal 5. The seal 6 has an annular shape and forms an opening at is center, through which a valve stem 9 is slidably mounted, in a leaktight manner.

The valve stem 9 comprises a first part 10, forming a product outlet passage, in the form of a tubular element and mended for the mounting of a dispensing and actuating device (not depicted), such as a push-button. The valve stem 9 also comprises a second, emerging, part 11, isolated from the first and intended to vent a compartment 12 of a regulating chamber 13 to substantially atmospheric pressure via an orifice 15. The orifice 15 is made in the end wall 18 of the valve stem. Arranged inside the compartment 12 of the regulating chamber 13 is a calibrated spring 14 intended to provide the regulating set-point and which will be discussed in greater detail later.

The first part 10 of the valve stem comprises a passage 17 passing radially through the tubular element. When the valve is in the rest position (as shown in FIG. 2A) under the action of the elastic return exerted by the spring 16, the passage 17 is arranged opposite the annular seal 6, so as to keep the valve in the closed position. For this, the spring 16 rests, on the one hand, against the end wall 21 of the regulating chamber and, on the other hand, against the end wall 3 of the valve body. The end wall 8 of the valve stem has an annular ridge 19 facing towards the seal 6 and which, under the action of the spring 16, is kept pressed against the seal 6, right around the valve stem 9, so as to ensure that closure is leaktight.

At the opposite side to the valve stem, the end wall 18 is secured to the regulating chamber 13, the outside diameter of which is essentially identical to the outside diameter of the end wall 18. The regulating chamber 13 is formed of a body 20 arranged coaxially inside the valve body 2, and the upper end of which is closed by the end wall 18 and the lower end of which is closed by an end wall 21. Mounted so that it can slide inside the regulating chamber 13 is a moving piston 22 isolating the upper compartment 12 from a lower compartment 23 in a leaktight manner. Arranged inside the compartment 12 is a spring 14 whose return force urges the moving piston 22 towards the end wall 21. Isolation between the upper compartment 12 and the lower compartment 23 is improved by the presence of a thin diaphragm 24, which is preferably made of an elastomeric material, the peripheral edge of which is secured to the interior wall of the body of the regulating chamber. Thus, the piston is isolated from the calibrated spring 14 by the diaphragm, preferably obtained by overmolding or two-shot injection molding with the regulating chamber body.

The end wall 21 of the regulating chamber 13 is pierced at its center with an orifice 25 that forms an inlet orifice for the regulating chamber. The body 20 of the regulating chamber 13 has passing through it, proximate to the end wall 21, an orifice 26 that forms an outlet orifice for the regulating chamber 13. On the opposite side to the compartment 12, the piston 22 is secured to a stem 27, arranged axially. The stem 27 passes through the orifice 25 and at its free end ends in a plateau 28 the outside diameter of which exceeds the diameter of the orifice 25. The stem for its part has an external cross section smaller than the cross section of the orifice 25 so as to allow the product to pass between the interior walls of the orifice 25 and the stem 27. The stem 27 is long enough to be able to pass from the position in which the inlet orifice is closed, as depicted in FIG. 2C, to the position in which the outlet orifice 26 is closed, as depicted in FIG. 2A. There is a seal 31 around the stem 27, in contact with the plateau 28, so as to ensure the leaktight closure of the inlet orifice 25 of the regulating chamber 13 in the event of an overpressure inside the regulating chamber.

The piston 22 is extended on the opposite side to the compartment 12 by a portion of annular skirt 29, the thickness of which decreases in the direction of the end wall 21. Thus, according to the pressure inside the container compared with the pressure of the calibrated spring 14, the relative position of the skirt portion 29 with respect to the outlet orifice 26 changes so as to uncover the outlet orifice 26 to a greater or lesser extent and thus regulate the outlet flow rate of product through the orifice 26. Sealing is achieved around the regulating chamber between the body 20 of the regulating chamber 13 and the internal wall of the valve body 2 by means of a sealing lip 30 preferably obtained by molding with the body 20 of the regulating chamber 13 and situated near to the end well 21 of the regulating chamber 13, below the outlet orifice 26.

The way in which such regulation works is as follows. In FIG. 2A, when the valve is in the un-mounted position, or in the case of a valve mounted on a container not yet full or practically empty, the calibrated spring 14 urges the piston 22, via the diaphragm 24, towards the end wall 21 of the regulating chamber, and the skirt 29 completely covers the outlet orifice 26. In this position, the valve stem is not actuated. The outlet passage 17 is situated opposite the seal 6.

In FIG. 2B, the valve stem 9 is actuated, that is to say depressed against the action of the return force from the spring 16, and this causes the outlet passage 17 to be uncovered. In this configuration, the pressure inside the compartment 23 is essentially equal to the pressure exerted by the calibrated spring 14. The piston 22 is in a position of equilibrium such that the inlet orifice 25 is not shut off by the plateau 28. The skirt portion 29 is above the orifice 26, which is completely uncovered. The product enters the regulating chamber through the orifice 25 and leaves the regulating chamber through the orifice 26, and is conveyed into the tubular part 10 of the valve stem 9 via the outlet passage 17.

When the pressure inside the compartment 23 drops, the piston 22 drops back down in the regulating chamber 13, thus reducing the open cross section of the outlet orifice, which causes the pressure in the regulating chamber to rise again until it returns to the normal operating pressure. When the pressure inside the container becomes too low, especially at the end of use, the outlet orifice 26 is completely shut off by the skirt 29, which completely interrupts the dispensing of product. The spring force of the calibrated spring 14 is chosen to be such as to allow optimum dispensing of the product and to allow dispensing to cease as soon as the product can no longer be dispensed or sprayed under acceptable conditions on account of an excessively low pressure.

As soon as the pressure in the regulating chamber 13 becomes too high, the piston 22 rises up in the regulating chamber. This rising of the piston 22 tends to shut off the inlet orifice 25 of the regulating chamber by means of the plateau 28. In the extreme position depicted in FIG. 2C, the inlet orifice 25 is shut off in a leaktight manner by the plateau 28. The outlet orifice 26 is wide open. As soon as the pressure in the compartment 23 drops again to return to a normal operating pressure, the inlet orifice 25 opens again and the product enters the compartment 23. This results in permanent equilibrium between the inlet 25 and the outlet 26 of the regulating chamber and therefore in excellent outlet pressure and/or flow rate regulation of the product dispensed by the valve.

Figure 3A:
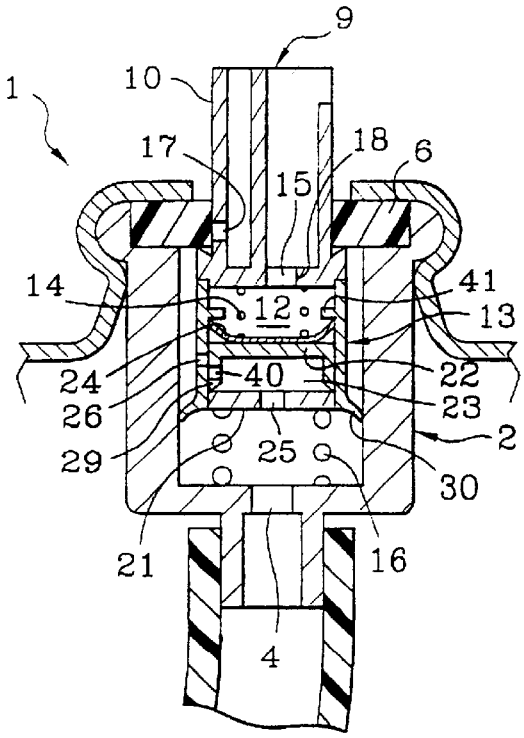
FIGS. 3A–3C are sectional views of a second embodiment of a valve according to the invention.
Figure 3B:
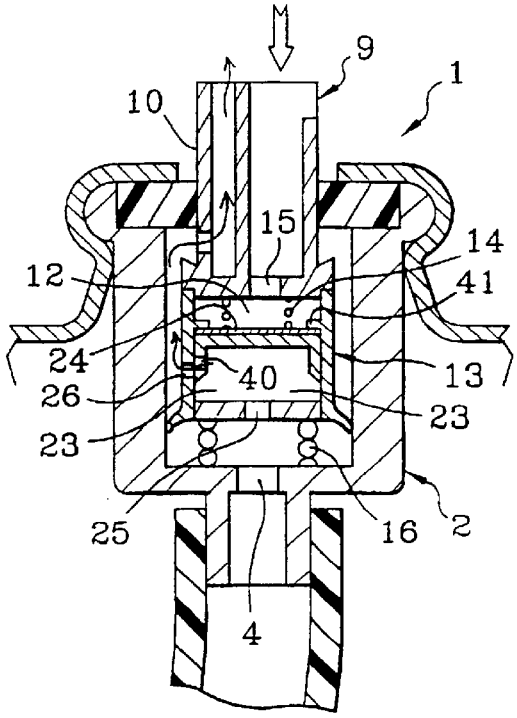
Figure 3C:
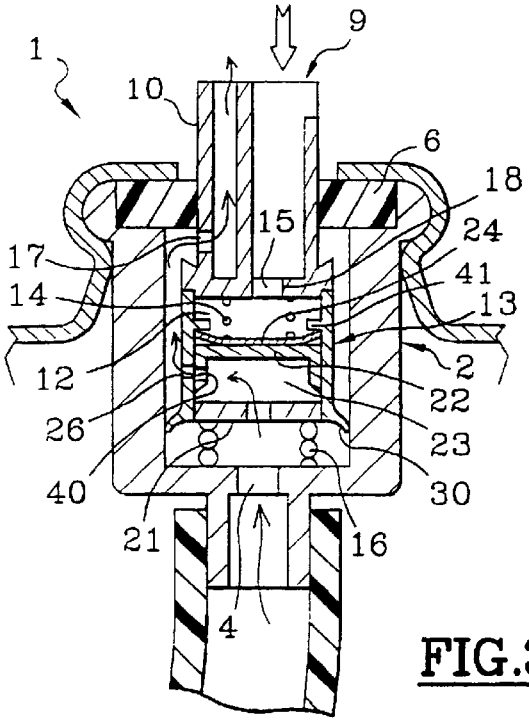

FIGS. 3A–3C to which reference is now made illustrate an alternative form of the embodiment of FIGS. 2A–2C. In this alternative form, only the product outlet flow rote is controlled, the compartment 23 of the regulating chamber 13 being at the same pressure as the container. Unlike in the first embodiment, the regulating chamber 13 has no means of shutting off the inlet orifice. In this embodiment, the means of shutting off the outlet orifice consist of a skirt portion 29 secured to the piston 22 and having an orifice 40 whose position with respect to the outlet orifice 26 determines the product outlet flow rate. In addition, stop-forming means 41 are provided in the compartment 12 so as to limit the rise of the piston in the regulating chamber so that it never completely shuts off the outlet orifice in the event of an overpressure in the regulating chamber.

The way in which such regulation works is as follows. In FIG. 3A, in the position in which the valve is not mounted, or in the case of a valve mounted on a container which has not yet been filled, the calibrated spring 14 urges the piston 22 towards the end wall 21 of the regulating chamber, and the orifice 40 is offset with respect to the orifice 26 so that the skirt 29 completely closes off the outlet orifice 26. In this position, the valve stem is not actuated. The outlet passage 17 is situated opposite the seal 6.

In FIG. 3C, the valve stem is actuated, that is to say depressed against the action of the return force of the spring 16, which causes the outlet passage 17 to be uncovered. In this configuration, the pressure inside the compartment 23 is essentially equal to the pressure exerted by the calibrated spring 14. The piston 22 is in a position of equilibrium sort that the orifice 40 is essentially aligned with the outlet orifice 26. The product enters the regulating chamber through the orifice 25, leaves the regulating chamber through the orifice 26 and is conveyed into the tubular part 10 of the valve stern 9 via the outlet passage 17.

When the pressure inside the container becomes too low especially at the end of use, the orifice 40 of the skirt 29 is no longer opposite the outlet orifice 26, which is completely shut off by the skirt 29 (see FIG. 3A), and this completely interrupts the dispensing of product. The spring force of the calibrated spring 14 is chosen such as to allow optimum dispensing of the product, and to allow dispensing to cease as soon as the product can no longer be dispensed or sprayed under acceptable conditions on account of an excessively low pressure.

As soon as the pressure in the compartment 23 of the regulating chamber 13 becomes too high, the piston 22 rises up in the regulating chamber. This rising of the piston 22 tends to shut off the outlet orifice 26 of the regulating chamber by offsetting the orifice 40 upwards to a greater or lesser extent with respect to the orifice 26, thus reducing the outlet flow rate. In the extreme position depicted in FIG. 3B, the piston 22 is up against the annular ring 41. In this position the outlet orifice 26 is kept minimally open, so that the valve does not block. When the pressure returns to a normal operating pressure, the piston returns to the position of equilibrium of FIG. 3C.

In the foregoing detailed description, reference was made to preferred embodiments of the invention. It is obvious that variations may be made thereto without departing from the spirit of the invention as claimed hereafter. By way of example, it is possible, especially in the case of viscous formulations, to dispense with the presence of the diaphragm 24 over the piston 22. Also by way of example, regulation may be achieved only at the inlet to the regulating chamber, with a stem and plateau device of the type described with reference to FIGS. 2A–2C.

What is claimed as new and desired to be secured by Letters Patent of the United States is:

1. A valve for a container, comprising:

a valve body;

an inlet passage provided in said valve body configured to communicate with a container;

an outlet passage communicating with the exterior of said container;

means for selectively communicating the outlet passage with said inlet passage in response to an actuation command;

first elastic return means for urging the valve into a closed position; and regulating means for regulating a product flow rate through said valve, comprising second elastic return means for supplying a set-point pressure for said regulating means, said second elastic return means arranged in a compartment of said valve body isolated from a product to be discharged from the container, wherein a pressure inside said compartment is substantially equal to atmospheric pressure.

2. The valve according to claim 1, wherein said flow rate regulating means comprises:

a regulating chamber arranged between said inlet passage and said outlet passage, said regulating chamber including an inlet orifice and an outlet orifice;

closing means for changing a degree of opening of at least one of said inlet orifice and said outlet orifice, in accordance with a pressure within said regulating chamber, said closing means being mounted on said second elastic return means; and a piston arranged to separate said compartment from the product.

3. The valve according to claim 2, wherein said piston is secured to said closing means.

4. The valve according to claim 3, wherein said closing means comprises:

first outlet closing means for closing said outlet orifice, comprising an annular skirt provided on said piston and arranged inside said regulating chamber, wherein a position of said annular skin with respect to said outlet orifice determines the degree of opening of said outlet orifice.

5. The valve according to claim 2, further comprising a flexible diaphragm provided in said regulating chamber between said piston and said second elastic return means so as to isolate said piston in a leaktight manner from said second elastic return means, wherein said piston is slidably mounted in said regulating chamber.

6. The valve according to claim 3, further comprising a flexible diaphragm provided in said regulating chamber between said piston and said second elastic return means so as to isolate said piston in a leaktight manner from said second elastic return means, wherein said piston is slidably mounted in said regulating chamber.

7. The valve according to claim 4, further comprising a flexible diaphragm provided in said regulating chamber between said piston and said second elastic return means so as to isolate said piston in a leaktight manner from said second elastic return means, wherein said piston is slidably mounted in said regulating chamber.

8. The valve according to claim 5, wherein said flexible diaphragm is at least one of overmolded and bi-injection molded with a body of said regulating chamber.

9. The valve according to claim 2, further comprising stop means for maintaining a minimum product outlet flow rote in the event of an overpressure inside said regulating chamber.

10. The valve according to claim 2, wherein said closing means includes inlet closing means secured to said piston for changing a degree of opening of said inlet orifice of said regulating chamber, in accordance with a pressure inside said regulating chamber;

wherein said closing means is configured such that when said inlet orifice is in the closed position, said outlet orifice is at least partially open.

11. The valve according to claim 2, wherein said inlet orifice is arranged in an end wall of said regulating chamber, wherein said outlet orifice is situated in a side wall of said regulating chamber at a predetermined distance from said end wall, and wherein said valve further comprises an annular lip arranged axially between said end wall of said regulating chamber and said outlet orifice, said annular lip configured to provide a seal between said regulating chamber and said valve body.

12. The valve according to claim 2, wherein said outlet passage is formed of a valve stem secured to said regulating chamber, said regulating chamber being mounted on said first elastic return means, and wherein said valve stem comprises a part that emerges from said valve body and forms an outlet duct that can be placed in communication with said valve body via a radial passage that passes radially through said valve stem.

13. The valve according to claim 12, wherein said valve stem is configured such that when said valve is in the closed position, said radial passage is kept opposite a seal located in said valve body.

14. The valve according to claim 13, wherein said seal is located in an upper part of said valve body.

15. The valve according to claim 2, wherein said closing means is configured such that when the pressure inside said regulating chamber drops below a predetermined value, said closing means closes said outlet orifice of said regulating chamber in a leaktight manner so as to interrupt dispensing of product.

16. A container for dispensing a product under pressure, this container being equipped with a valve, said valve comprising:

a valve body;

an inlet passage provided in said valve body configured to communicate with a container;

an outlet passage communicating with said inlet passage;

means for selectively communicating the outlet passage with said inlet passage in response to an actuation command;

first elastic return means for urging the valve into a closed position; and regulating means for regulating a product now rate though said valve, comprising second elastic return means for supplying a set-point pressure for said regulating means, said second elastic return means arranged in a compartment of said valve body isolated from a product to be discharged from the container, wherein a pressure inside said compartment is substantially equal to atmospheric pressure.

17. The container according to claim 16, further comprising a container body defining a reservoir containing the product to be dispensed, an end wall closing a first end of said container, and a push-button for actuating the valve, wherein said valve is provided on a second end of said container.

18. The container according to claim 17, wherein said push-button comprises a diffuser for discharging the product, said diffuser comprising at least one of a nozzle, a grid, and a porous end piece.

19. The container according to claim 17, wherein said diffuser comprises a swirl-inducing nozzle.

20. The container according to claim 17, wherein said diffuser comprises a sinter or an open-cell foam.

*21. The container according to claim 16, further comprising a container body defining a reservoir containing the product to be dispensed, an end wall closing a first end of said container, and a push-button for actuating the valve, wherein said valve is provided on a second end of said container.*

*22. The container according to claim 21, wherein said push-button comprises a diffuser for discharging the product, said diffuser comprising at least one of a nozzle, a grid, and a porous end piece.*

*23. The container according claim 21, wherein said diffuser comprises a swirl-inducing nozzle.*

*24. The container according to claim 21, wherein said diffuser comprises a sinter or an open-cell foam.*

*25. A valve for a container, comprising:*

*a valve body:*

*an inlet passage provided in said valve body and configured to communicate with a container;*

*an outlet passage communicating with the exterior of said container;*

*an opening/closing element for selectively communicating the outlet passage with the inlet passage;*

*a barrier which is movable to control a degree of opening/closing of an outlet orifice in communication with the outlet passage;*

*a first elastic return element positioned to urge the opening/closing element into a closed position; and*

*a second elastic return element positioned in a compartment of said valve body which is at atmospheric pressure and which is isolated by said barrier from a product to be discharged from the container, said second elastic return element pressing on said barrier in opposition to the pressure of the product to be discharged from the container.*

*26. The valve according to claim 25, further comprising as regulating chamber arranged between said inlet passage and said outlet passage, said regulating chamber including an inlet orifice and said outlet orifice, wherein said barrier comprises a piston whose position changes in accordance with a pressure within said regulating chamber.*

*27. The valve according to claim 26, wherein said piston includes a skirt which is positionable to close said outlet orifice.*

*28. The valve according to claim 27, wherein said skirt comprises an annular skirt provided on said piston and arranged inside said regulating chamber, wherein a position of said annular skirt with respect to said outlet orifice determines the degree of opening/closing of said outlet orifice.*

*29. The valve according to claim 26, wherein said barrier further comprises a flexible diaphragm isolating said compartment from said regulating chamber.*

*30. The valve according to claim 27, wherein said barrier further comprises a flexible diaphragm isolating said compartment from said regulating chamber.*

*31. The valve according to claim 28, wherein said barrier further comprises a flexible diaphragm isolating said compartment from said regulating chamber.*

*32. The valve according to claim 31, wherein said flexible diaphragm is at least one of overmolded and bi-injection molded with a body of said regulating chamber.*

*33. The valve according to claim 25, further comprising a stop positioned for maintaining a minimum product outlet flow rate in the event of an overpressure inside said regulating chamber.*

*34. The valve according to claim 25, further comprising an inlet closing element secured to said piston, wherein said closing element is configured such that when said inlet orifice is closed, said outlet orifice is at least partially open.*

*35. The valve according to claim 25, wherein said inlet orifice is arranged in an end wall of said regulating chamber, wherein said outlet orifice is situated in a side wall of said regulating chamber at a predetermined distance from said end wall, and wherein said valve further comprises an annular lip arranged axially between said end wall of said regulating chamber and said outlet orifice, said annular lip configured to provide a seal between said regulating chamber and said valve body.*

*36. The valve according to claim 25, wherein said outlet passage is formed of a valve stem secured to said regulating*

*chamber, said regulating chamber being mounted on said first elastic return element, and wherein said valve stem comprises a part that emerges from said valve body and forms an outlet duct that can be placed in communication with said valve body via a radial passage that passes radially through said valve stem.*

*37. The valve according to claim 36, wherein said valve stem is configured such that when said valve is in the closed position, said radial passage is facing a seal located in said valve body.*

*38. The valve according to claim 37, wherein said seal is located in an upper part of said valve body.*

*39. The valve according to claim 26, wherein in said barrier is configured such that said outlet orifice is closed when the pressure inside said regulating chamber drops below a predetermined value.*

*40. A container for dispensing a product under pressure, the container having a valve comprising:*

*a valve body;*

*an inlet passage provided in said valve body and configured to communicate with the container;*

*an outlet passage communicating with the exterior of said container;*

*an opening/closing element, for selectively communicating the outlet passage with the inlet passage;*

*a barrier which is movable to control a degree of opening/closing of an outlet orifice in communication with the outlet passage;*

*a first elastic return element positioned to urge the opening/closing element into a closed position; and*

*a second elastic return element positioned in a compartment of said valve body which is at atmospheric pressure and which is isolated by said barrier from a product to be discharged from the container, said second elastic return element pressing on said barrier in opposition to the pressure of the product to be discharged from the container.*

*41. A valve for dispensing a product from a container, comprising:*

*a regulating chamber defining an inlet orifice, an outlet orifice, a first compartment and a second compartment, wherein said first compartment includes said inlet orifice to receive said product, and said second compartment is isolated from said first compartment so that said second compartment is isolated from said product in said first compartment;*

*a movable divider disposed inside said regulating chamber between said first and second compartments; and*

*a positioning device disposed in said second compartment such that said positioning device is isolated from said product in said first compartment, said positioning device being coupled to said movable divider so as to position said movable divider in at least a first position and a second position,*

*wherein said product passes through said outlet orifice when said movable divider is positioned in said first position and said product cannot pass through said outlet orifice when said movable divider is positioned in said second position.*

*42. The valve according to claim 41, wherein said second compartment is maintained at atmospheric pressure.*

*43. The valve according to claim 41, wherein said movable divider comprises a piston.*

*44. The valve according to claim 41, wherein said positioning device comprises a spring.*

*45. The valve according to claim 41, further comprising an inlet closing element coupled to said movable divider such that said product cannot pass through said inlet orifice when said movable divider is in said first position.*

*46. The valve according to claim 41, further comprising a valve body; an inlet passage provided in said valve body and configured to communicate with said container; an outlet passage communicating with the exterior of said container; an opening/closing element for selectively communicating the outlet passage with the inlet passage; and an elastic return element positioned to urge the opening/closing element into a closed position.*

* * * * *